United States Patent [19]

Stiffler

[11] Patent Number: 5,751,939
[45] Date of Patent: May 12, 1998

[54] MAIN MEMORY SYSTEM AND CHECKPOINTING PROTOCOL FOR FAULT-TOLERANT COMPUTER SYSTEM USING AN EXCLUSIVE-OR MEMORY

[75] Inventor: Jack J. Stiffler, Hopkinton, Mass.

[73] Assignee: Texas Micro, Inc., Houston, Tex.

[21] Appl. No.: 564,665

[22] Filed: Nov. 29, 1995

[51] Int. Cl.⁶ .................................................. G06F 11/00
[52] U.S. Cl. ........................... 395/182.13; 395/488
[58] Field of Search ............................... 295/180, 181, 295/182.01, 182.08, 182.11, 182.13, 182.14, 182.18, 182.19, 488; 364/285.2, 285

[56] References Cited

U.S. PATENT DOCUMENTS

| | | |
|---|---|---|
| 3,588,829 | 6/1971 | Boland . |
| 3,736,566 | 5/1973 | Anderson et al. .................. 395/182.13 |
| 3,761,881 | 9/1973 | Anderson et al. .................. 395/183.03 |
| 3,803,560 | 4/1974 | DeVoy et al. ........................ 395/182.03 |
| 3,889,237 | 6/1975 | Alferness et al. ........................ 395/475 |
| 3,979,726 | 9/1976 | Lange et al. ............................ 395/462 |
| 4,020,466 | 4/1977 | Cordi et al. ............................ 395/617 |
| 4,044,337 | 8/1977 | Hicks et al. ............................. 395/250 |
| 4,164,017 | 8/1979 | Randell et al. .................... 395/182.13 |
| 4,228,496 | 10/1980 | Katzman et al. ........................ 395/308 |
| 4,373,179 | 2/1983 | Katsumata .............................. 395/417 |
| 4,393,500 | 7/1983 | Imazeki et al. .................... 395/182.02 |
| 4,403,284 | 9/1983 | Sacarisen et al. ......................... 395/800 |

(List continued on next page.)

FOREIGN PATENT DOCUMENTS

| | | | |
|---|---|---|---|
| 55-41528 A | 3/1980 | Japan | G06F 11/16 |
| 55-115121 A | 9/1980 | Japan | G06F 3/00 |
| 58-31651 A | 2/1983 | Japan | H04M 3/22 |

OTHER PUBLICATIONS

N. Bowen and D. Pradhan, "Processor–and Memory–Based Checkpoint and Rollback Recovery." 1993 IEEE Transactions on Computers, pp. 22–30.

Y. Lee and K. Shin, "Rollback Propagation Detection and Performance Evaluation of FTMR$^2$M—A Fault Tolerant Multiprocessor," 1982 IEEE Transactions on Computers, pp. 171–180.

C. Kubiak et al., "Penelope: A Recovery Mechanism for Transient Hardware Failures and Software Errors," 1982 IEEE Transactions on Computers, pp. 127–133.

A. Feridun and K. Shin, "A Fault–Tolerant Multiprocessor System with Rollback Recovery Capabilities," 1981 IEEE Transactions on Computers, pp. 283–298.

(List continued on next page.)

*Primary Examiner*—Albert Décady
*Attorney, Agent, or Firm*—Wolf, Greenfield & Sacks, P.C.

[57] ABSTRACT

A mechanism for returning a computer system to a consistent, periodically updated state in main memory without constraining normal computer operation is provided, thereby enabling a computer system to recover from faults without loss of data or processing continuity. In a typical computer system, a processor and input/output elements are connected to a main memory subsystem that includes a primary memory. A checkpoint memory element which may include one or more buffer memories, including a read buffer and a write buffer, and an exclusive-or memory block, is also appended to this main memory subsystem. The exclusive-or memory block is a block of memory corresponding in size to one block of the primary memory that can fail as a unit. The exclusive-or memory block contains an exclusive-or of the contents of the primary memory at a previous checkpoint state. During normal processing, both or either a pre-image and/or a post image of data written to primary memory may be captured by the checkpoint memory element. In one embodiment, a write operation is converted to a read-then-write operation to store pre-image data in a FIFO. An exclusive-or of pre-image and post-image data is exclusive-or'ed into the exclusive-or memory. When a fault occurs in the computer system, the data stored in the buffer memories, along with the contents of the exclusive-or memory block, are used to ensure that the primary memory is restored to a previous checkpointed state from which the computer system can recover. This structure and protocol can guarantee a consistent state in the primary memory, thus enabling fault-tolerant operation.

9 Claims, 7 Drawing Sheets

U.S. PATENT DOCUMENTS

| | | | |
|---|---|---|---|
| 4,413,327 | 11/1983 | Sabo et al. | 395/489 |
| 4,426,682 | 1/1984 | Riffe et al. | 395/462 |
| 4,435,762 | 3/1984 | Milligan et al. | 395/250 |
| 4,459,658 | 7/1984 | Gabbe et al. | 364/200 |
| 4,484,273 | 11/1984 | Stiffler et al. | 395/290 |
| 4,566,106 | 1/1986 | Check, Jr. | 395/183.08 |
| 4,654,819 | 3/1987 | Stiffler et al. | 395/489 |
| 4,734,855 | 3/1988 | Banatre et al. | 395/491 |
| 4,740,969 | 4/1988 | Fremont | 395/182.13 |
| 4,751,639 | 6/1988 | Corcoran et al. | 395/182.09 |
| 4,819,154 | 4/1989 | Stiffler et al. | 395/182.18 |
| 4,819,232 | 4/1989 | Krings | 395/182.11 |
| 4,905,196 | 2/1990 | Kirrmann | 365/200 |
| 4,924,466 | 5/1990 | Gregor et al. | 395/181 |
| 4,941,087 | 7/1990 | Kap | 395/733 |
| 4,958,273 | 9/1990 | Anderson et al. | 395/800 |
| 4,964,126 | 10/1990 | Musicus et al. | 371/36 |
| 4,965,719 | 10/1990 | Shoens et al. | 395/427 |
| 5,157,663 | 10/1992 | Major et al. | 395/182.08 |
| 5,214,652 | 5/1993 | Sutton | 395/182.08 |
| 5,239,637 | 8/1993 | Davis | 395/492 |
| 5,247,618 | 9/1993 | Davis | 395/841 |
| 5,263,144 | 11/1993 | Zurawski et al. | 395/448 |
| 5,269,017 | 12/1993 | Hayden et al. | 395/182.13 |
| 5,276,848 | 1/1994 | Gallagher et al. | 395/448 |
| 5,313,647 | 5/1994 | Kaufman et al. | 395/700 |
| 5,325,517 | 6/1994 | Baker et al. | 395/182.09 |
| 5,325,519 | 6/1994 | Long et al. | 395/182.13 |
| 5,327,532 | 7/1994 | Ainsworth et al. | 395/200.1 |
| 5,369,757 | 11/1994 | Spino et al. | 395/182.17 |
| 5,418,916 | 5/1995 | Hall et al. | 395/569 |
| 5,418,940 | 5/1995 | Mohan | 395/183.03 |
| 5,488,719 | 1/1996 | Schultz | 395/611 |
| 5,633,635 | 5/1997 | Chen et al. | 395/479 |

OTHER PUBLICATIONS

P. Lee et al., "A Recovery Cache for the PDP-11," IEEE Transactions on Computers, vol. C-29 No. 6 Jun. 1980, pp. 546-549.

M. Banatre, A. Gefflaut, C. Morin, "Scalable Shared Memory Multiprocessors: Some Ideas To Make Them Reliable", in Hardware and Software Architectures for Fault Tolerance, Springer-Verlag, 1994 Lecture Notes in Computer Science, presented after Jun. 10, 1993.

Levy et al. "Incremental Recovery in Main Memory Database Systems" IEEE 1992, pp. 529-540.

MAIN MEMORY SYSTEM AND CHECKPOINTING PROTOCOL FOR FAULT-TOLERANT COMPUTER SYSTEM USING AN EXCLUSIVE-OR MEMORY

FIELD OF THE INVENTION

The present invention is related to computer memory systems and checkpointing protocols, particularly for fault tolerant computer systems.

BACKGROUND OF THE INVENTION

Fault tolerance in computers is generally realized in either of two ways: either through a hardware-intensive technique called masking, or a software-based approach called checkpointing. Masking is achieved by replicating hardware and executing computer programs on several independent units in parallel. The outputs of these units are then compared to determine their validity. In the simplest and oldest embodiment of this technique, three complete computers are implemented and a simple majority vote on their outputs is used to determine the "correct" output. If at least two of the computers are functioning properly and the voter system itself is also working correctly, the potentially incorrect output of the malfunctioning computer is outvoted and the correct answer is indeed presented to the user. While there are other embodiments of masking that are somewhat more efficient, masking systems generally suffer from the significantly increased cost of the hardware that must be added to mask out the effect of a faulty component. In addition, masking protects only against hardware faults; a software bug that causes one unit to malfunction will also cause other units running the same software to malfunction in the same way. All outputs will contain the same error which as a result will, as a result, pass undetected.

The alternative technique called checkpointing has the potential of providing tolerance to faults in a considerably more cost-effective way. This technique requires that the state of the entire computer be periodically recorded at time intervals designated as checkpoints. A fault may be detected by either a hardware fault monitor (e.g., by a decoder operating on data encoded using an error detecting code, by a temperature or voltage sensor, or by one device monitoring another identical device) or by a software fault monitor (e.g., an assertion executed as part of the executing code that checks for out-of-range conditions on stack pointers or addresses into a data structure). If a fault is detected, recovery involves first diagnosing and circumventing a malfunctioning unit, if possible, and then returning the system to the last checkpoint and resuming normal operation from that point.

Recovery is possible if sufficient hardware remains operational after any elements identified as faulty during the recovery process have been circumvented. In a multiprocessor system, for example, the system can continue to operate as long as at least one of the processors continues to function. Similarly, a system that can remap memory or redirect I/O through alternate ports can survive the loss of memory or I/O resources as well. Moreover, most faults encountered in a computer system are transient or intermittent in nature, exhibiting themselves as momentary glitches. It is therefore generally possible to recover from such faults without circumventing any hardware. However, since transient and intermittent faults can, like permanent faults, corrupt the data that is being manipulated at the time of the fault, it is necessary to have a consistent state to which the computer can return following such events. This is the purpose of the periodic checkpointed state.

Since checkpoints are typically established every 50 milliseconds or so, rolling an executing program back to its last checkpoint is generally entirely transparent to a user. If handled properly, all applications can be resumed from their last checkpoints with no loss of continuity and no contamination of data.

There are two primary advantages to checkpointing relative to masking. First, checkpointing is considerably less expensive to implement. Second, checkpointing offers protection against software as well as hardware faults. The first advantage simply reflects the fact that checkpointing does not require massive replication of hardware. The second advantage is a consequence of the fact that most software bugs remaining in well tested, mature software are exposed only in exceptional situations. Were this not true, the bugs would have been found and removed during normal testing. Such exceptional situations are generally caused by some asynchronous event such as an interrupt that forces program execution to follow a sequence that would not otherwise have been followed. If the system is forced to roll back to a consistent state and continue forward, that is, if the software bug is treated like a hardware transient, it is highly unlikely that the system will encounter exactly the same exception in exactly the same state as before. Consequently, it is highly unlikely that it will encounter the same bug a second time.

Checkpointing also suffers from two potential disadvantages relative to masking. First, masking generally results in instantaneous or near-instantaneous recovery from faults. Any resulting errors are simply masked, so no explicit recovery is necessary. Checkpointing requires that certain software routines be executed to diagnose the problem and to circumvent any permanently malfunctioning component of the computer. As a consequence, the resulting recovery time, typically on the order of one second, may preclude the use of this technique for achieving fault tolerance for some real-time applications where response times on the order of milliseconds or less are required. In applications in which humans directly interact with the computer, e.g., in transaction processing applications; however, a momentary interruption of a second or so is entirely acceptable and, in fact, is generally not even perceptible. Thus, this potential disadvantage of checkpointing is not relevant to that class of applications.

Second, checkpointing has traditionally been achieved at the application level. Thus, the application programmer has been required to be concerned about what data has to be checkpointed, and when it should be done. This requirement places a serious burden on the programmer and has seriously impeded the widespread use of checkpointing as a means for achieving fault tolerance.

More recently, techniques have been developed that allow checkpointing to be done at the system software level so that the application programmer need not be concerned with attempting to identify the data that has to be checkpointed or even be aware that checkpointing is taking place. For this to be possible, the system itself must be able to establish periodic checkpoints, regardless of the applications that it might be running. U.S. Pat. Nos. 4,654,819 and 4,819,154 to Stiffler describe a computer system capable of doing exactly that. The system accomplishes this kind of checkpointing by requiring each of its processors to retain all modified data in its local cache until it is time to establish a new checkpoint at which time all modified data is flushed out to main memory. Such caches are sometimes called blocking caches. Prior to flushing its blocking cache, a processor does a context switch during which it places the contents of its internal registers, including its program counter, on a stack which is flushed out with all the other modified data. Consequently, memory is updated all at once with data that is internally consistent, thereby establishing a checkpoint to which the system can safely return should it subsequently suffer a fault. To guarantee the ability to survive both main memory faults and faults experienced during the flushing operation itself, memory is duplicated, with each data item stored in both a primary location and a shadow location.

While this technique does accomplish its goal of establishing checkpoints without burdening the application programmer, it does have certain disadvantages due to its dependence on the use of a blocking cache. Since a processor cannot write any cache line back to main memory unless it writes back all currently modified lines at the same time, any cache overflow or any request by one processor for data held in another processor's cache requires the processor releasing the data to flush its entire cache. This requirement precludes the use of standard cache coherency protocols (for example, the protocol described in U.S. Pat. No. 5,276,848 to Gallagher) and creates potential porting and performance problems when programs are executed that rely on such standard protocols.

Other methods for capturing data for checkpointing purposes have been proposed, for example, by Kirrmann (U.S. Pat. No. 4,905,196) and by Lee et al. ("A Recovery Cache for the PDP-11 ", IEEE Trans. on Computers, June, 1980). Kirrmann's method involves a cascade of memory storage elements consisting of a main memory, followed by two archival memories, each of the same size as the main memory. Writes to the main memory are also written by the processor into a write buffer. When it is time to establish a checkpoint, the buffered data is then copied by the processor first to one of the archival memories and then to the second, although techniques are also described that eliminate the need for one of the copies. The two archival memories ensure that at least one of them contains a valid checkpoint, even if a fault occurs while a buffer-to-memory copy is in progress. Some problems with this architecture include a triplication of memory, the use of slow memory for the archival memory and the effect on processor performance since the three memory elements are different ports on the same bus.

The paper by Lee et al. discusses a method for saving data in a recovery cache before updated data is written to memory, for all memory locations falling within an application-specified range of addresses. This method involves converting all writes to memory within the range specified by the application into read-before-write operations. If a fault occurs during the execution of the application, the contents of the recovery cache are stored back into main memory, thereby restoring it to the state that it was when the application began its current execution. One problem with this method is that it slows the host system due to interference with memory cycles by the read-then-write operations which are required. It also requires checkpointing to be handled or considered by the application programmer.

Other techniques have been developed to establish mirroring of data on disks rather than in main memory. Since disk access is orders of magnitude slower than main memory access, such schemes have been limited to mirroring data files, that is, to providing a backup to disk files should the primary access path to those files be disabled by a fault. No attempt is made to retain program continuity or to recover the running applications transparently to the users of the system. In some cases, it is not even possible to guarantee that mirrored files are consistent with each other, only that they are consistent with other copies of the same file. U.S. Pat. 5,247,618 discloses one example of such a scheme.

SUMMARY OF THE INVENTION

Embodiments of the present invention provide a device and process for maintaining, in a computer system, a consistent, periodically updated checkpoint state in the computer system's main memory while allowing the use of conventional cache coherency protocols and non-blocking caches. The invention involves providing a main memory which is accessed by a processor or an I/O device through one or more logical ports in which a primary memory element and a checkpoint memory element are both coupled to the port. The primary memory element is accessed in the same way as a standard main memory. The checkpoint memory element captures accesses (i.e., writes and/or reads) to the main memory which are detectable because the checkpoint memory element is connected to the same port as the primary memory element. These captured accesses are then used to ensure the existence of a consistent checkpoint state in the main memory. Such a computer system with the appropriate detection and circumvention procedures can recover from faults without loss of data integrity or processing continuity.

In one embodiment of the present invention, an exclusive-or buffering scheme is used to provide fault tolerance in a computer system. The computer system of this embodiment comprises a main memory having N blocks of M lines each, and one or more memory buses or other connections to the main memory. The computer system further comprises a checkpoint memory element including a read buffer memory, an optional write buffer memory, an exclusive-or stage, all of which are attached to the same connections, and an exclusive-or memory equal in size to one block of the N blocks of the main memory. The read buffer memory captures a pre-image of all data that is to be written back to the main memory. The write buffer memory captures data written to the main memory. At each checkpoint, the exclusive-or stage performs an exclusive-or of the contents at corresponding addresses of the buffer memories with the contents of the exclusive-or memory at those same addresses modulo M, and stores the result of the exclusive-or operation back into the same location in the exclusive-or memory. This procedure results in the exclusive-or memory containing an exclusive-or of the contents of the corresponding blocks of main memory. If a failure of a block of the main memory occurs, the contents of the failed memory block may be recovered by performing an exclusive-or of the contents at corresponding locations of each of the blocks of the main memory (exclusive of the contents of the failed block) with those of the exclusive-or memory. The result of this exclusive-or operation is the restored state of the failed block. The contents of the read buffer can then be used to restore the entire main memory, including the replacement for the failed block, back to the previous checkpoint state.

In a system in accordance with this invention, input and output (I/O) operations are normally handled in the following manner. During normal operations, I/O requests are made in any standard way, and are entered on an appropriate I/O queue by the operating system. However, the actual physical I/O operation is not initiated until the next checkpoint. Thus, in the event of a fault and a subsequent rollback to a checkpointed state, all pending I/O operations are also checkpointed. Disk and other idempotent I/O operations, i.e., operations that can be repeated without changing the result, can simply be restarted.

The appropriate disposition of communications I/O activities depends upon the communication protocol. For those protocols that accommodate the possible duplication of messages, the pending I/O can be restarted. For those that handle dropped messages, the I/O can be deleted from the pending queue. For those protocols that do not handle either dropped messages or repeated messages, the pending I/O is deleted from the pending queue. If the message was not actually sent before the fault, or was aborted as a result of the fault, the effect is the same as a transient communication link failure with the same consequences to the application or to the user. Since communication link interruptions are generally considerably more common than computer faults, the use of a protocol that cannot make such events transparent presumably means that the user or the application is prepared to cope with them in any event.

The mechanisms described herein can guarantee the existence of a consistent checkpoint state from which the computer can resume operation following a fault, thus enabling fault-tolerant operation.

BRIEF DESCRIPTION OF THE DRAWINGS

For a better understanding of the present invention, reference is made to the drawings which are incorporated herein by reference and in which.

DETAILED DESCRIPTION

The present invention will be more completely understood through the following detailed description which should be read in conjunction with the attached drawings in which similar reference numbers indicate similar structures. Reference is made to Applicant's co-pending U.S. patent application Ser. No. 08/674,660, filed Jul. 2, 1996, which is a continuation of U. S. application Ser. No. 08/258,165 filed Jun. 10, 1994, now abandoned, which is incorporated herein by reference.

Figure 1:
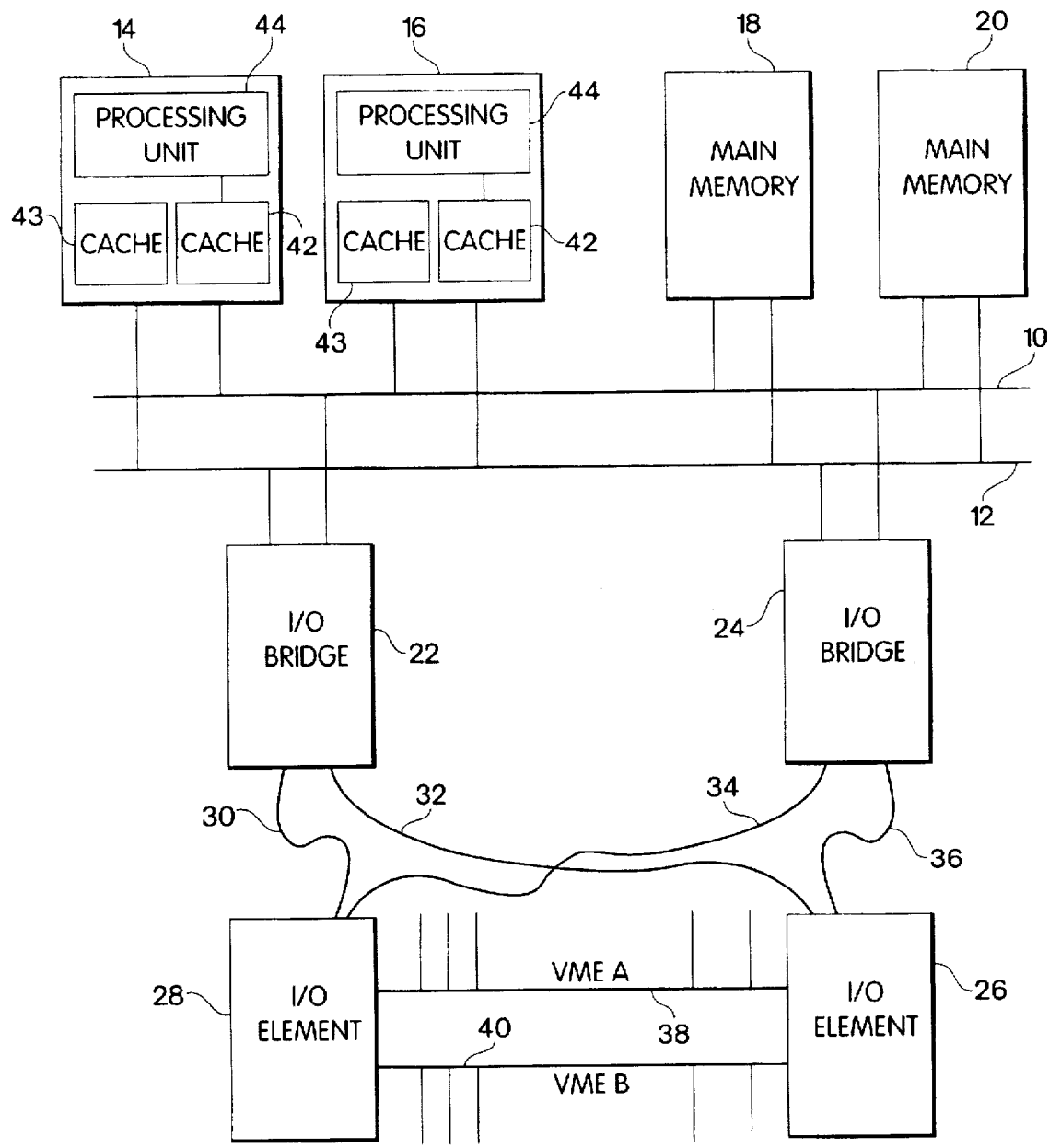
FIG. 1 is a block diagram of a computer system which uses a main memory structure of one embodiment of the present invention.

FIG. 1 is a block diagram of a computer system 11 with which the invention generally may be used. One or more processing elements 14 and 16 are connected to one or more main memory systems 18 and 20 via interconnection mechanisms 10 and 12 such as a bus or crosspoint switch. One or more input/output (I/O) subsystems 22 and 24 are also connected to the interconnection mechanism 10 (12). Each I/O subsystem comprises an input/output (I/O) element or bridge 26 (28) and one or more buses 30 and 32 (34 and 36). An I/O element 26 (28) may also be connected to any standard I/O bus 38 (40), such as a VME bus. For ease of description, only one of each of these systems and subsystems is referred to below.

Each processing element, e.g., 14, includes a processing unit 44 connected to a cache 42. This connection also connects the processing unit 44 and the cache 42 to the interconnection mechanism 10. The processing unit 44 may be any standard microprocessor unit (MPU). For example, the PENTIUM microprocessor, available from Intel Corporation, is suitable for this purpose. The processing unit 44 operates in accordance with any suitable operating system, as is conventional. A processing element 14 may include dual processing units 44 for self-checking purposes.

The cache 42 is either a write-through or a write-back type of cache and has an arbitrary-size and associativity and may consist of more than one cache level in a hierarchical structure. The processing unit 44 may store in the cache 42 either data only or both computer program instructions and data. In the former case, an additional similar instruction cache 43 may be connected to the processing unit 44 for the processing unit 44 to store computer program instructions. This connection also connects the instruction cache 43 to the interconnection mechanism 10. If this system is a multiprocessing computer system, each processing unit 44 may use any conventional mechanism to maintain cache coherency, such as bus snooping. The cache 42 is connected to a main memory system, e.g., 18, via interconnection mechanism 10.

Figure 2:
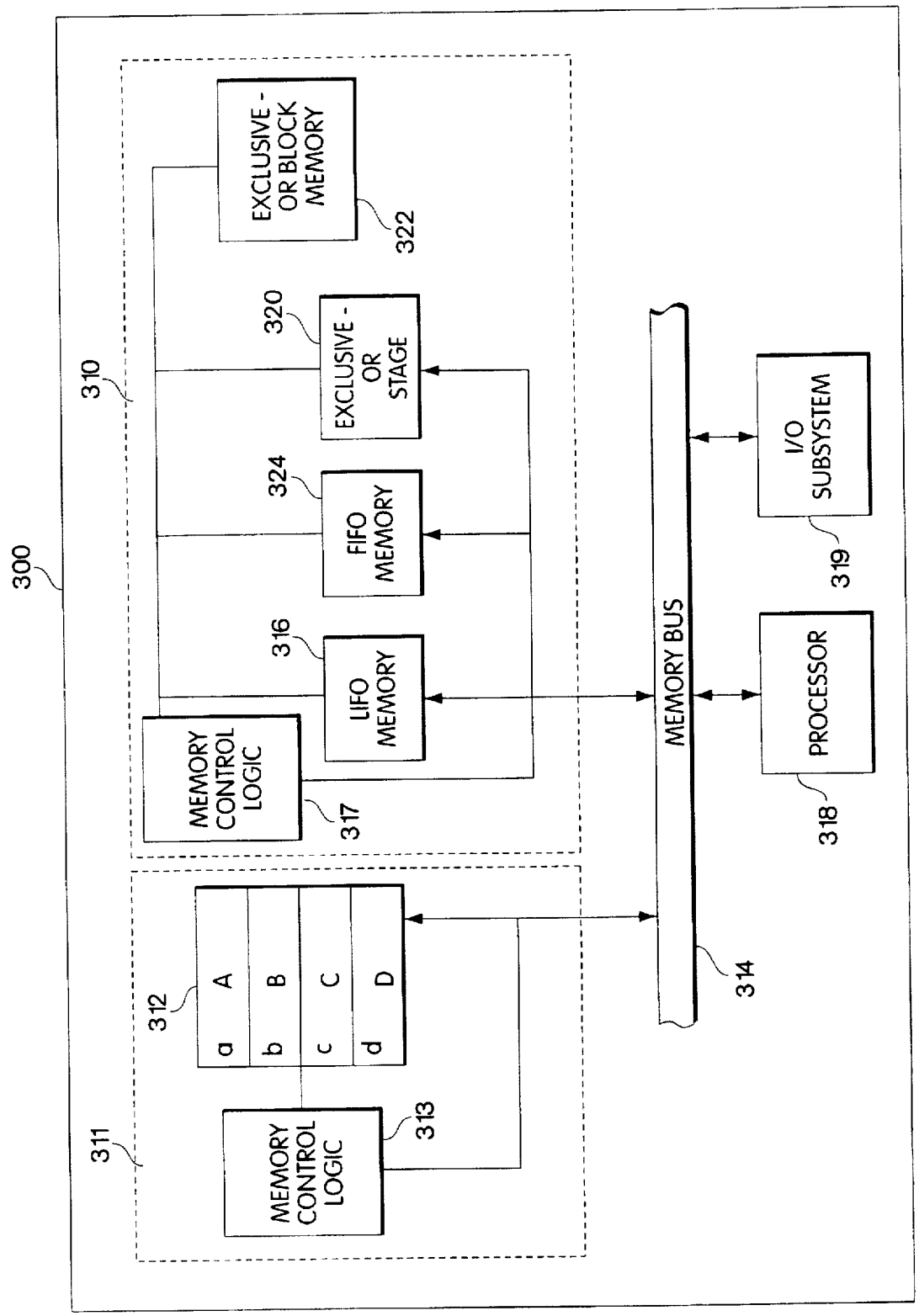
FIG. 2 is a block diagram of a fault tolerant computer system in accordance with one embodiment of the present invention utilizing exclusive-or buffering.
Figure 3:
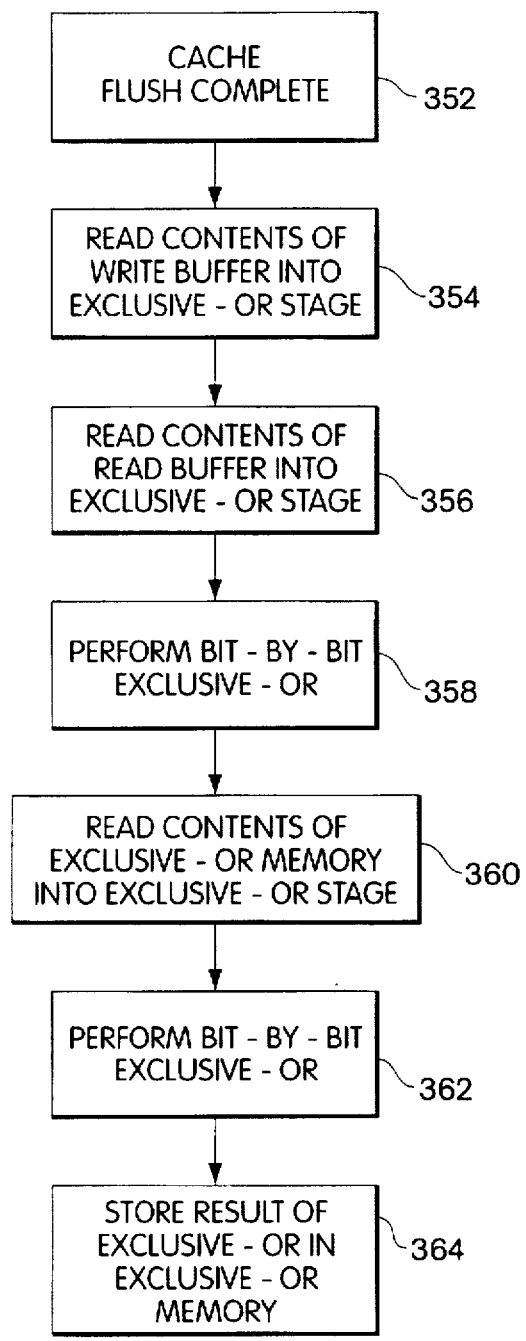
FIG. 3 is a flowchart of a method of establishing a checkpoint using the embodiment of FIG. 2.

Referring now to FIG. 2, a fault tolerant computer system 300 as shown in accordance with the invention utilizes an exclusive-or buffering scheme. Like computer system 11 in FIG. 1, the fault tolerant computer system 300 of FIG. 2 includes one or more processors 318, one or more memory buses 314, one or more I/O interfaces (not shown) and a main memory 311. The main memory 311 includes a primary memory 312 which is partitioned into segments or blocks of identical size and a memory control logic 313. The partitioning of the primary memory 312 is inherent in most memory implementations. A block is typically defined as a subset of the physical devices (e.g., SIMMs) with which the storage elements are implemented. For example, a 128 megabyte memory might be implemented using 8 16-megabyte SIMMs partitioned as 4 blocks of two SIMMs each, each block thereby storing $2^{22}$ 64-bit words.

The fault tolerant computer system of FIG. 2 also includes a checkpoint memory 310 comprising a LIFO buffer memory 316, a FIFO buffer memory 324, an exclusive-or stage 320, and an exclusive-or memory block 322 coupled to the exclusive-or stage and memory control logic 317 for controlling transfer of data between the buffers and the exclusive-or stage. The LIFO memory 316 stores certain reads from the primary memory 312. The LIFO memory 316 stores only those reads that are subsequently modified. This may be accomplished using a cache coherency protocol such that the first attempt to modify any cache line is made visible to the remainder of the system, or by converting each memory write to a read followed by a write. It should be understood that an access may involve a partial or an entire cache line. The FIFO buffer memory 324, stores data written to the primary memory 312. The exclusive-or memory block 322 is a block of memory corresponding in size to one block of the memory 312 that can fail as a unit and from which failure it is desired to be able to recover. The exclusive-or stage 320 accepts corresponding lines from any of the three checkpoint storage elements (LIFO, FIFO, and exclusive-or memory block) performs a bit-by-bit exclusive-or operation on these lines and stores the result of the exclusive-or operation in the exclusive-or block memory 322. Corresponding lines are defined as follows: if the primary memory contains NM lines partitioned into N equal blocks, then two lines are corresponding if their physical addresses are congruent modulo (M). Thus, if main memory contains $2^{22}$ 64-byte lines and is partitioned into four equal blocks, two lines correspond if their physical addresses differ by some multiple of $2^{20}$.

In the fault tolerant computer system 300, checkpoints are initiated and cache flushing occurs as shown in FIGS. 3, 5, 6A and 6B. This description will be provided in connection with FIG. 1. To checkpoint a consistent system state, processors flush their caches in a synchronized manner. Once a processing element 14 has begun a flush, it cannot resume normal operation until all other processing elements 14 have completed their flushes, except under certain conditions discussed below.

This process allows data to be passed from one processing element 14 to another processing element 16 without requiring the entire cache 42 of processing unit 14 to be flushed. If all processing units 44 in the computer system 11 have access to all buses or communication paths to the main memories, each processing unit 44 may use conventional bus snooping methods to assure cache coherency. If all processing units 44 do not have access to all system buses, the processing units 44 may use other well-known cache coherency techniques instead.

Processor cache flushing is synchronized because the checkpoint memory needs to distinguish between post-flush and pre-flush data. Thus, if the checkpoint memory does not know what processor is sending data, all processors must complete their flushes before normal operation can begin in order to maintain consistency. Synchronization is preferably controlled using a test-and-set lock or equivalent operation using a designated location in main memory 18, such as indicated at 80 in FIG. 5, to store the lock value. To ensure that it is possible to recover from primary memory element failures as well as other failures, this designated location is preferably implemented as part of a status register in the checkpoint memory element. A failure in the checkpoint memory element does not disrupt normal operation. Consequently, this status register is not needed in this event.

Figure 6A:
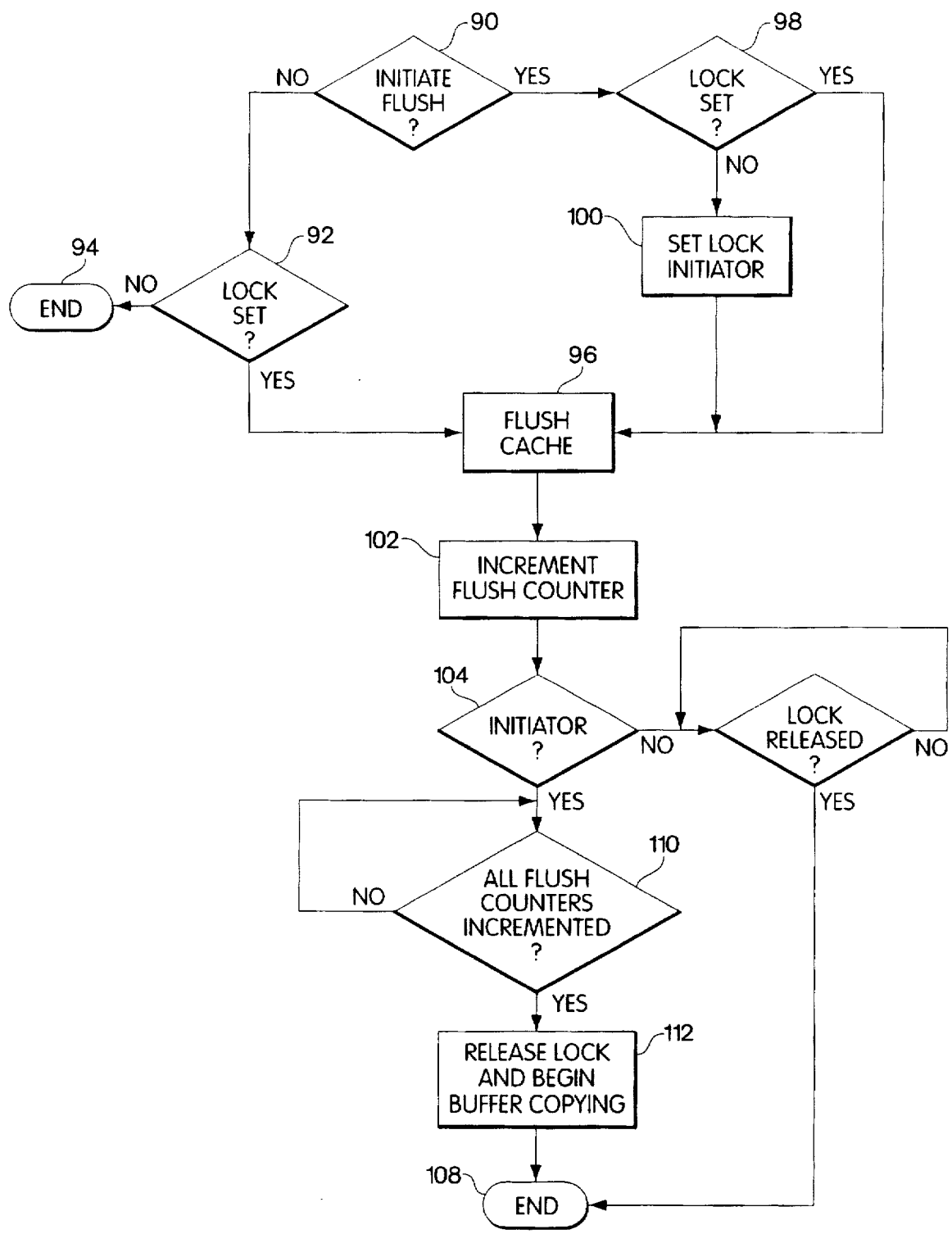
FIG. 6A is a flowchart describing how each processing unit controls flushing of its cache to maintain main memory consistency.

At periodic intervals, each processing unit 44 determines whether it should initiate a flush operation as indicated at step 90 in FIG. 6A. The processing unit 44 can make this determination in a number of different ways. Typically, a flush may be initiated after a fixed period of time has elapsed.

If this processing unit 44 does not need to initiate a flush, then it examines the designated memory location 80 to determine whether another processing unit 44 has already set the lock (step 92). If the lock is not set, this process ends as indicated at 94. Otherwise, if the lock is set, this processing unit 44 flushes its cache 42 in step 96. The effect of the flushing operation is to store all lines in the cache (or preferably only those lines that have been modified since the last flush) to the primary memory element 312 and checkpoint memory element 310. Prior to the actual flushing operation, the processing unit 44 saves its state in the cache 42 so that this information is flushed as well.

Input and output (I/O) operations are normally handled in the following manner. During normal operations, I/O requests are made in any standard way, and are entered on an appropriate I/O queue by the operating system. However, the actual physical I/O operation is not initiated until the next checkpoint. Thus, in the event of a fault and a subsequent rollback to a checkpointed state, all pending I/O operations are also checkpointed. Disk and other idempotent I/O operations, i.e., operations that can be repeated without changing the result, can simply be restarted.

The appropriate disposition of communications I/O activities depends upon the communication protocol. For those protocols that accommodate the possible duplication of messages, the pending I/O can be restarted. For those protocols that handle dropped messages, the I/O can be deleted from the pending queue. For those protocols that do not handle either dropped messages or repeated messages, the pending I/O is deleted from the pending queue. If the message was not actually sent before the fault, or was aborted as a result of the fault, the effect is the same as a transient communication link failure with the same consequences to the application or to the user. Since communication link interruptions are generally considerably more common than computer faults, the use of a protocol that cannot make such events transparent presumably means that the user or the application is prepared to cope with them in any event.

If the processing unit 44 determines in step 90 that it should initiate a flush, it then determines whether the lock is already set in step 98, similar to step 92. If the lock is already set, the processing unit 44 continues by flushing its cache 42 in step 96. Otherwise, it sets the lock in step 100, sends a message to the other processors to trigger their flush line operations thereby identifying itself as the initiator of the flush, before flushing its cache 42.

Figure 5:
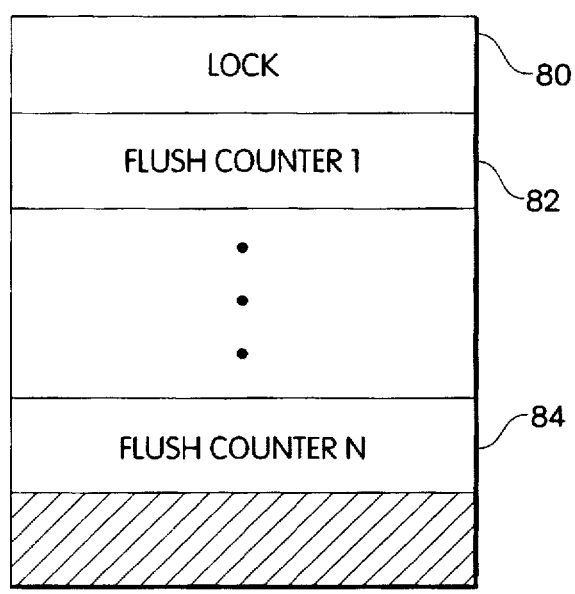
FIG. 5 is a diagram of memory locations used by the processing units to maintain main memory consistency.

After a processing unit 44 flushes its cache 42 in step 96, it increments its corresponding flush counter in step 102. As indicated in FIG. 5, each processing unit 44 has a flush counter, such as shown at 82 and 84. After the flush counter (e.g., 82) is incremented, the processing unit 44 determines whether it is the initiator of this flush sequence (step 104). If it is not the initiator, it then waits until the lock is released in step 106. When the lock is released, this process ends in step 108 and the processing unit 44 may resume normal operations.

If the processing unit 44 is the initiator of the flush as determined in step 104, it then waits until all flush counters (82–84) are incremented in step 105. Once all flush counters have been incremented, this processing unit 44 sends a commit command to indicate that the flushing operations are complete (see step 352 of FIG. 3), and releases the lock (step 107). Receipt of the command notifies the checkpoint memory element 310 that the flush has completed. Once this command has been sent, the flush lock is released and the processing units 44 can resume normal processing. The loops around steps 106 and 110 should have time-out protection which triggers fault recovery procedures, in the event of a failure during flushing operations.

Note that the flush counters described here may be 1-bit counters and hence can also readily be implemented as part of the status register in the checkpoint memory element. The bits can be set individually by each processor and then automatically reset when the initiator sends the commit command thereby instructing the checkpoint memory element to begin the copy from its buffer to the shadow memory.

Some performance advantage can be gained if certain non-standard bus protocols are also implemented. For example, if the bus protocol allows the checkpoint memory element 310 to distinguish between processing elements 14, or at least to identify whether a line being stored has been written by a processing element 14 that has completed its ith flush or is still executing its ith flush, or at least to distinguish pre-flush from post-flush data, a processing element 14 does not have to wait until all other processing elements have completed their flushes before it resumes normal operation. In this case, consistency is maintained in main memory by requiring a processing element 14 to suspend normal operation after completing its ith flush only until all other processing elements 16 have also at least begun (but not necessarily completed) their ith flushes.

Figure 6B:
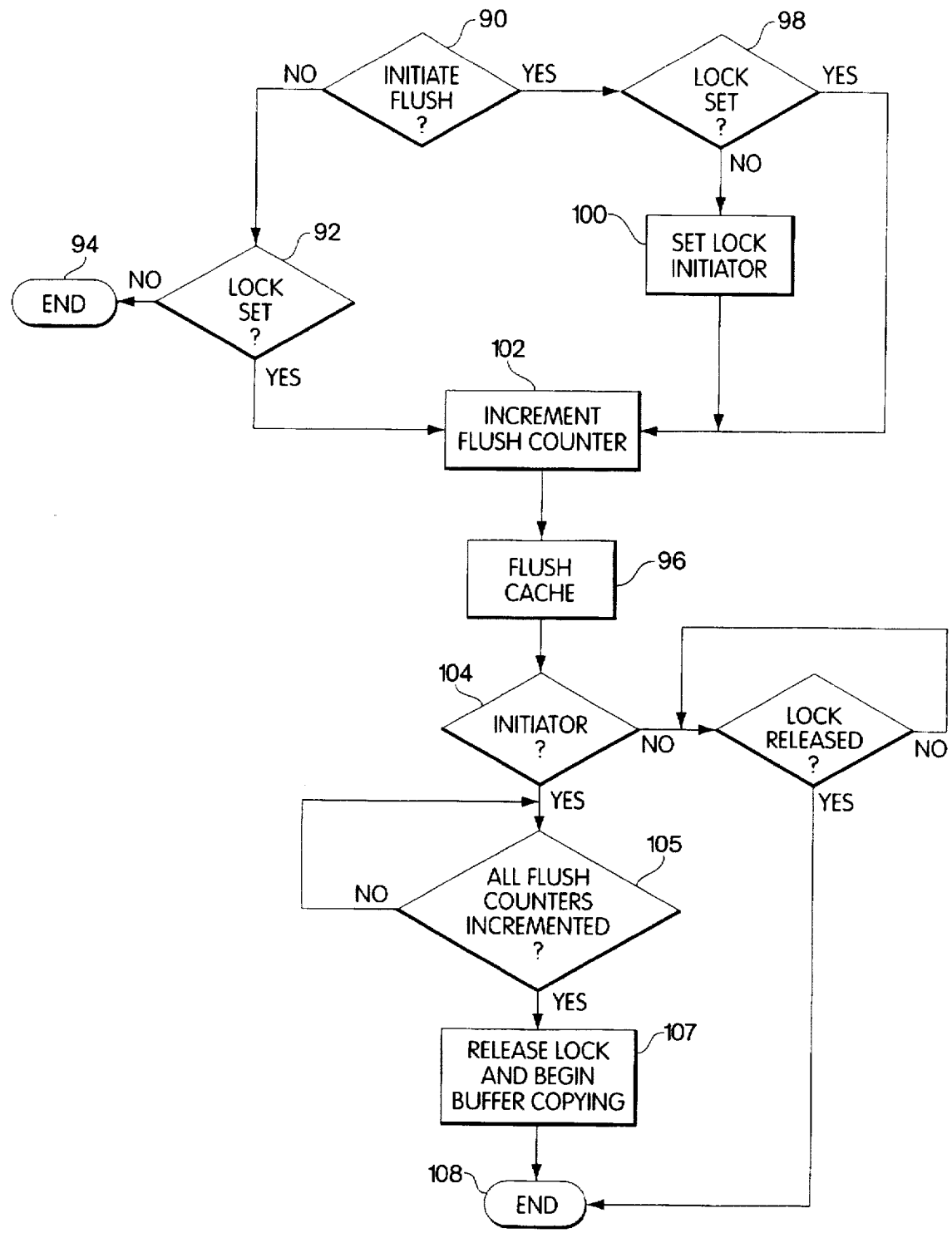
FIG. 6B is a flowchart describing an alternate method by which each processing unit controls flushing of its cache to main memory.

This relaxed synchronization restriction still ensures the existence of a consistent checkpoint state. That is, it guarantees that a processing element 16 that has not begun its flush does not receive post-flush modified data from another processing element 14 that has completed its flush and resumed normal processing. This less restrictive synchronization protocol can be allowed if the checkpoint memory, perhaps using the bus protocol, can distinguish between data that is being written as part of the flushing operation and data that is being written by a processing element 14 that has completed its flush. To implement this kind of cache flushing synchronization, the order and placement of steps 96 and 102 in FIG. 6A may be reversed as shown in FIG. 6B.

At the completion of processor cache flushing (step 352), during each checkpointing operation, the contents of both the read buffer and the write buffer are read into the exclusive-or stage (steps 354 and 356). A bit-by-bit exclusive-or operation is performed on the corresponding lines of the read memory, the write memory and the exclusive-or block memory (steps 358, 360, and 362, which can be performed in any order), and the result is stored in the exclusive-or memory block (step 360). In this manner, the exclusive-or memory block contains an exclusive-or of the contents of lines within the primary memory 312.

In an exemplary embodiment, the contents of four corresponding lines of the four blocks of memory 312 (A, B, C, D) are denoted as a, b, c, and d as shown in FIG. 2. The corresponding line in the exclusive-or memory block contains the exclusive-or of these four lines (a+b+c+d) with "+" denoting the bit-by-bit exclusive-or operation. Subsequent to a checkpoint, the line having contents a may be read from block A of memory 312 by the processor 318, modified in the processor to become a', and written back to the memory 312. At this stage, the LIFO read memory 316 will contain memory line contents a in the state they were in when read from the memory 312, and the FIFO write memory 324 will contain the contents a'. If there are no additional modifications to any of the four lines in question, then after cache flushing during a checkpoint operation, the LIFO read memory contains a, the FIFO write memory contains a' and the exclusive-or memory block contains a+b+c+d. As part of the checkpoint operation, an exclusive-or is performed by the exclusive-or stage of the corresponding contents of the LIFO read memory and the exclusive-or block memory. The result of this exclusive-or operation, b+c+d, is stored in the exclusive-or memory. An exclusive-or is then performed on this result, b+c+d, with the contents of the FIFO write buffer memory, a', resulting in a'+b+c+d (the order of the exclusive-or operations is immaterial). This final result, a'+b+c+d, is stored in the exclusive-or memory block and represents the checkpoint state and is equal to the exclusive-or of the updated contents of the corresponding lines of the memory blocks of memory 312.

As described above, each write to memory 312 subsequently requires four accesses (2 writes, 2 reads) of the exclusive-or memory. If each of these accesses requires the same time as a write to memory 312, then the exclusive-or buffering scheme may limit the performance of a system in which memory writes comprise more than 25% of the memory operations.

In the case of a fault, other than a fault in the primary memory, the data captured in the read buffer is used to restore all lines of the primary memory that were modified since the last checkpoint to their state as of the last checkpoint. The LIFO read buffer memory contains, for any lines in the primary memory modified since the last checkpoint, the state of these lines at the last checkpoint.

Figure 4:
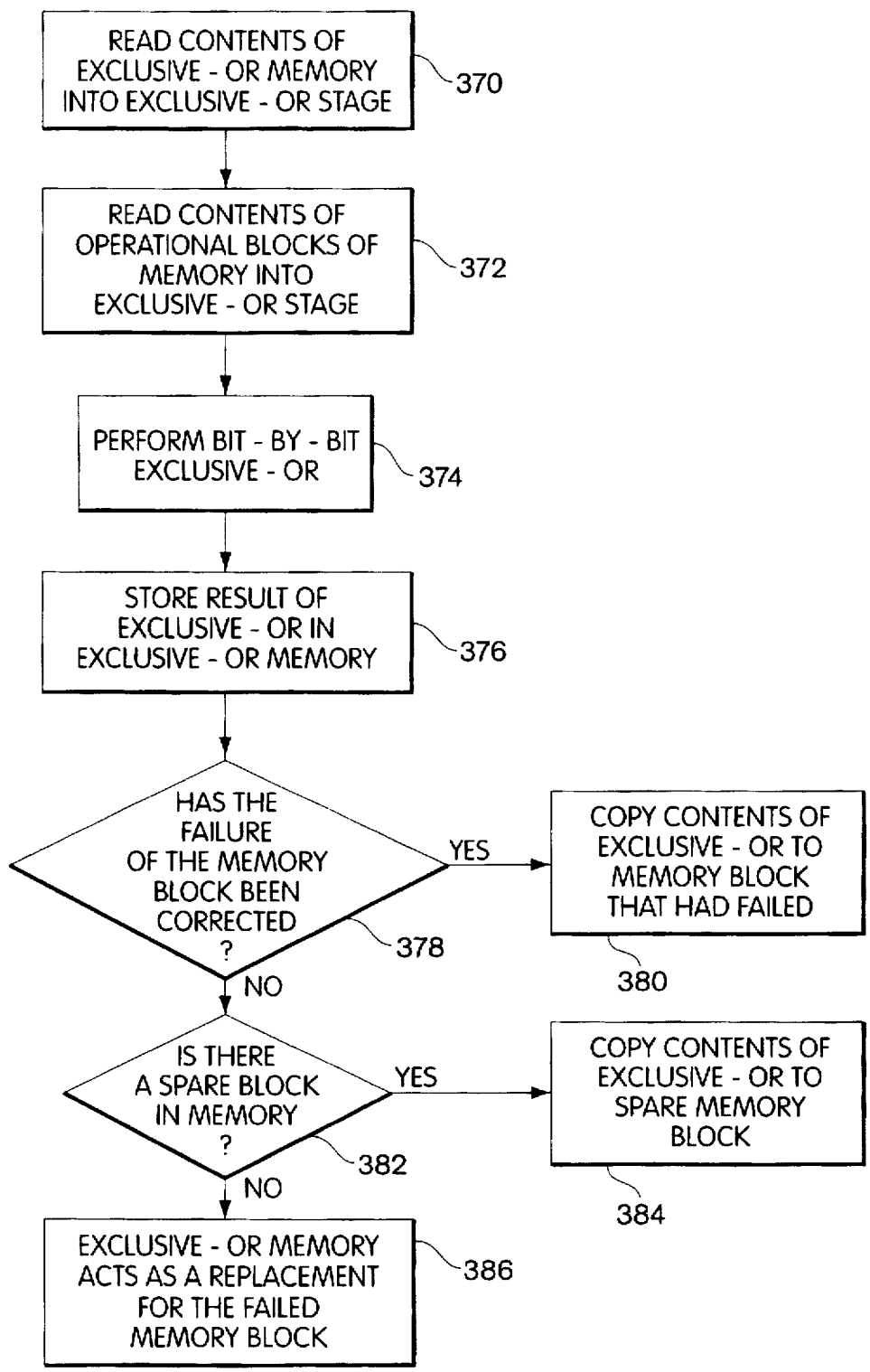
FIG. 4 is a flowchart of a method of recovering from a fault in the computer system shown in FIG. 2.

The procedure for restoring the contents of a memory block in memory 312 following a failure of that memory block is shown in FIG. 4. An exclusive-or is performed in the exclusive-or stage of the contents of the lines in the exclusive-or memory block 322 with the contents of the corresponding lines of each of the remaining operational blocks (i.e. all blocks except the failed block) of memory 312 (steps 370, 372 and 374). The result of this exclusive-or operation is stored in the exclusive-or memory block (step 376), so that the contents of the exclusive-or memory block are now identical to those of the failed memory block at the time of the failure. These contents may be either copied back to the failed memory block (steps 378 and 380), if the failure condition has been corrected (e.g., was a transient event), copied to a spare memory block if one exists (steps 382, 384), or retained in the exclusive-or memory block 322 (step 386). In the latter case, the exclusive-or memory block 322 acts as a replacement for the failed memory block until the failed memory block is repaired or replaced. In this latter case, the computer no longer retains the ability to recover from subsequent memory block failures until the failed block is repaired. All other fault recovery capability remains as long as the checkpoint memory continues to function, continuing to use the read LIFO buffer, but now using the exclusive-or memory block as the replacement block for the failed memory block.

The exclusive-or stage 320 and the exclusive-or block memory have been described as separate devices. It should be understood that in a preferred embodiment of the present invention the functions of the exclusive-or stage may be integrated directly into the storage devices used to implement the exclusive-or block memory. In this embodiment, the limitations discussed above regarding access time of the exclusive-or memory may be mitigated.

In one version of this embodiment of the present invention, the write buffer shown in FIG. 2 is not included in the system. In this embodiment, the LIFO memory captures all reads from the primary memory 312 as discussed above. When a line is written to the primary memory, the exclusive-or stage captures the write, reads the corresponding line from the LIFO memory and the exclusive-or memory, performs a bit-by-bit exclusive-or operation on the corresponding lines, and stores the result in the exclusive-or memory. In this manner, the contents of the exclusive-or memory provide an exclusive-or mirror of the contents of the primary memory.

In this embodiment, checkpoints are initiated and cache flushing occurs in a similar manner as in the previously described embodiment of the invention and the fault recovery techniques are identical to those described for that embodiment. However, this embodiment also requires the LIFO to be fully associative or content-addressable. This embodiment allows a higher percentage of write operations since the ex-or of the read from and the write to a location in primary memory can be pipelined with the ex-or of the result into the ex-or memory.

In a third embodiment of this invention, a typical write operation is converted to read-then-write operation, which can be done without modification to the normal bus protocol. The pre-image is then stored in the FIFO and the ex-or of the pre- and post-images are then ex-ored into the ex-or memory. Since these operations can be pipelined, the checkpoint memory element can keep up with the primary memory without any further restriction. However, by converting the normal writes into read-then-writes, the bandwidth of the primary memory is reduced somewhat.

Checkpoints in this embodiment are established in the same way as in the read-buffering case since the ex-or memory is no longer a checkpoint memory but, rather, one that reflects the current state of the primary memory. Consequently, if a memory block fails, it is first necessary to reconstruct that block using the ex-or memory and then to restore all memory to its last checkpointed state using the LIFO, thus reversing the order of operations of the previously described embodiments.

In embodiments of the present invention described above, individual elements, including processors, memories, and I/O devices, of computer systems have been described as being interconnected by one or more memory buses. It should be understood that the memory buses may be replaced by other interconnecting mechanisms for transferring data, such as a cross-point switch, to accomplish the same function.

While a number of embodiments and variations of the present invention have been described, it should be recognized that each of them has its own advantages and disadvantages relative to the others and that no one of them is superior to all the others in all situations. Which embodiment is most appropriate for a given situation depends upon the underlying computer platform to which it is being applied and upon the desired level of fault tolerance.

One advantage of the present invention over the prior art is that the checkpointing mechanism avoids the need for duplicating main memory, yet protects against memory as well as other hardware and software faults. In particular, it allows the computer system to recover from the loss of any block of memory without having to provide a shadow memory for the entire memory. Another advantage is that users of the system or applications being executed require no involvement with, or even awareness of, the checkpointing process. Still another advantage is that the invention provides an efficient way of backing up the contents of main memory, as the failure of any one of N blocks of main memory can be recovered from by increasing the amount of that memory by only 1/Nth.

Given the embodiments of the invention described herein, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A computer system comprising:
    a processor;
    a main memory subsystem, coupled to the processor, including:
        an exclusive-or memory for storing an exclusive-or checkpoint state;
        a buffer that monitors accesses of the main memory subsystem by the processor and stores data related to the accesses; and
        means, using the data from the buffer and the exclusive-or memory, for ensuring the existence of a consistent checkpoint state in the main memory subsystem to which processing can resume without loss of data integrity or program continuity following a fault.

2. The computer system of claim 1, wherein the processor has a corresponding input/output subsystem which provides input/output events initiated by the processor, wherein the processor has means for queuing input/output events between checkpoints and means for flushing the queued events to the primary memory element when a checkpoint is to be established, whereby input/output events are captured in checkpoint data in the main memory subsystem.

3. The computer system of claim 1, wherein a read-then-write operation is performed when the processor performs a write operation to the main memory subsystem, and further comprising means for storing a pre-image in a FIFO, means for performing an exclusive-or operation on pre-image and post-image data of the write operation and means for storing the result of the exclusive-or operation in the exclusive-or memory.

4. A computer system comprising:
    a processor having a cache that is periodically flushed to establish a checkpoint;
    an input/output port;
    a main memory subsystem coupled to the processor and to the input/output port, including:
        a read buffer, coupled to the processor and external port, that stores a pre-image of data to be written to the main memory subsystem;
        a write buffer, coupled to the processor and external port, that stores data written to the main memory subsystem;
        an exclusive-or memory; and
        an exclusive-or stage, coupled to the read and write buffers and to the exclusive-or memory;
        wherein after the cache of the processor is flushed, the exclusive-or stage reads data from the read buffer, the write buffer, and the exclusive-or stage, performs an exclusive-or operation on the data read by the exclusive-or stage, and stores a result of the exclusive-or operation in the exclusive-or memory thereby establishing a backup of the main memory subsystem in the exclusive-or memory.

5. The computer system of claim 4, wherein the main memory subsystem includes a plurality of memory blocks each having equal storage capacity and each capable of failing independently from other memory blocks of the plurality of memory blocks, and wherein the exclusive-or memory has a storage capacity substantially equal to the storage capacity of any one of the plurality of memory blocks.

6. The computer system of claim 4, wherein, upon occurrence of a fault in one of the plurality of memory blocks of the main memory, the main memory is restored to a state at a previous checkpoint using contents of the exclusive-or memory and the read buffer, and the exclusive-or stage reads all data contained within the main memory except for data of the failed block, performs an exclusive-or operation of the data read from the main memory with data contained within the exclusive-or memory, and stores a result of the exclusive-or operation in the exclusive-or memory, the result representing the data of the failed memory block at the time of the fault.

7. A method for providing fault tolerance in a computer system having a processor with a cache, an external port, a main memory subsystem, a read buffer memory, a write buffer memory, and an exclusive-or memory, the method comprising steps of:
    capturing a pre-image of data that is to be written to the main memory subsystem;
    storing the pre-image data in the read buffer;
    capturing write data written to the main memory subsystem;
    storing the write data in the write buffer;

reading the read data from the read buffer;

reading the write data from the write buffer;

performing an exclusive-or operation on the write data, the read data and the data contained within the exclusive-or memory to obtain an exclusive-or result; and storing the exclusive-or result in the exclusive-or memory to establish a checkpoint in the exclusive-or memory.

8. The method of claim 7, wherein the main memory subsystem includes a plurality of memory blocks each having equal storage capacity, wherein the exclusive-or memory has a storage capacity equal to the storage capacity of any one of the plurality of memory blocks, and wherein the method further includes steps of:

detecting a failed memory block of the plurality of memory blocks;

copying data stored in the read buffer memory to the main memory subsystem to restore the main memory, except the failed memory block, to a previous checkpoint state;

reading data contained within the plurality of memory blocks of the main memory except data contained within the failed memory block;

reading data contained within the exclusive-or memory;

performing an exclusive-or operation on the data read from the plurality of memory blocks and the data read from the exclusive-or memory to obtain an exclusive-or result; and storing the exclusive-or result in back into one of the exclusive-or memory and a spare memory block.

9. The method of claim 8, further comprising a step of:

storing the exclusive-or result in the failed memory block after it has recovered from the failure.

* * * * *